(No Model.)
W. A. LINDSAY.
ILLUMINATING TILE PLATE.
No. 259,768. Patented June 20, 1882.
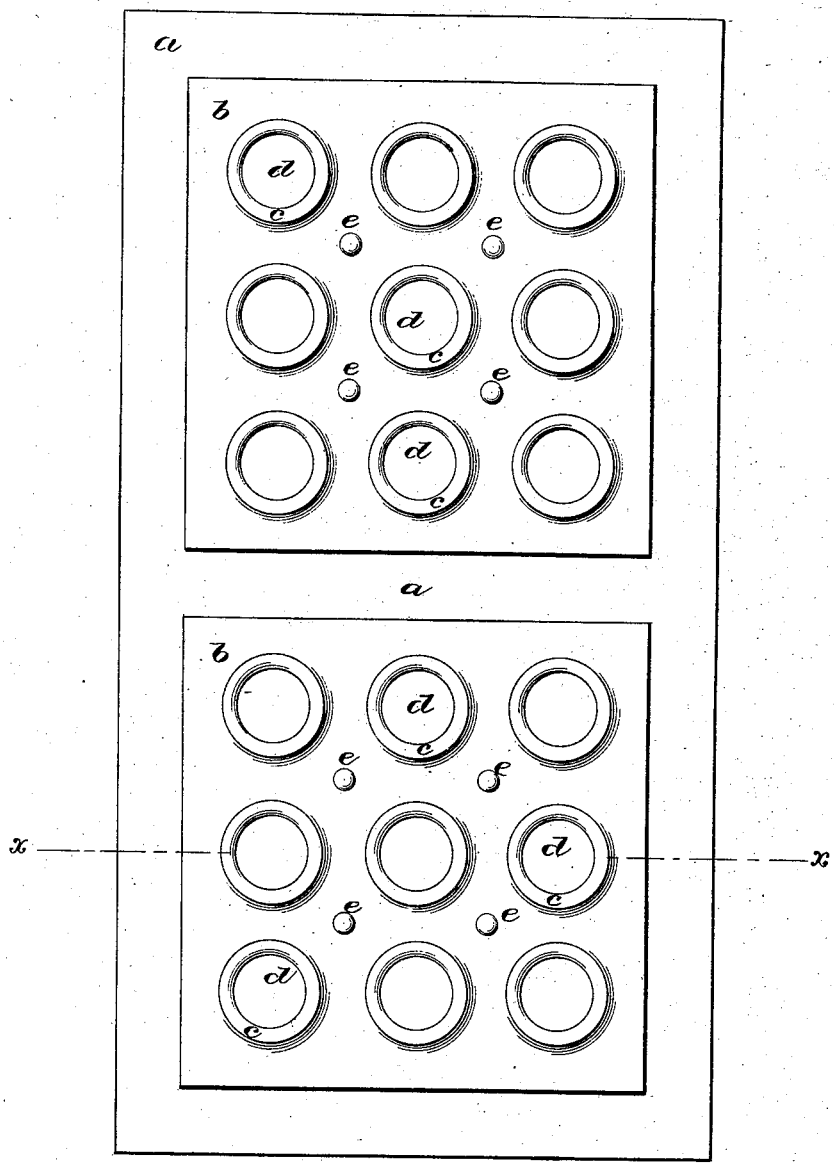
Witnesses  Inventor.

UNITED STATES PATENT OFFICE.

WILLIAM A. LINDSAY, OF NEW YORK, N. Y., ASSIGNOR OF ONE-HALF TO CHARLES E. FURMAN, OF SAME PLACE.

ILLUMINATING TILE-PLATE.

SPECIFICATION forming part of Letters Patent No. 259,768, dated June 20, 1882.

Application filed April 11, 1881. (No model.)

*To all whom it may concern:*

Be it known that I, WILLIAM A. LINDSAY, of the city, county, and State of New York, have invented certain new and useful Improvements in Illuminating Tile-Plates; and I do hereby declare the following to be a full, clear, and exact description thereof, reference being had to the drawings accompanying and forming part of this specification.

Illuminating tile-plates heretofore used for sidewalks, areas, roofs, elevator-doors, &c., have been constructed in either one of the following methods, namely: The plate with its contained sockets for the retention of the lenses was made wholly out of cast metal. This gave such a heavy structure that its use was largely limited to small sizes of plates. When larger plates were required resort was had to those constructed of rolled metal, in order to obtain corresponding lightness of structure. What was gained, however, in this direction was in a measure lost in another direction—namely, the quality of the rigidity of the cast-metal plate. This lack of rigidity not only resulted in a sagged and warped plate, but the elasticity of the rolled metal tended to bring a pressure on the lenses which either frequently broke them or caused them to spring out of their seats or sockets, so that while the latter or rolled plate attained to the desirable feature of lightness of structure, and thereby enabled the builder to employ more conveniently and safely larger plates, still there were lacking the qualities of rigidity and durability of the former or cast-metal plate.

By my improvements I am enabled to construct plates that combine all of these desirable qualities, and that shall combine a maximum of strength with a minimum weight of material.

The invention consists in the combination of a rolled-metal plate with re-enforcing cast-metal plates, in which latter plates are seated the lenses, such lenses projecting up through perforations made in the first-mentioned plate.

In the drawings is shown one way in which my invention may be embodied in an illuminating tile-plate.

Figure 1 is a plan view of the reverse side of the illuminating tile-plate; and Fig. 2 is a cross vertical section thereof, taken through the line *x x* of Fig. 1.

*a* is a rolled-metal plate, perforated as required, with suitable openings for glass lenses.

*b b* are cast-metal re-enforcing plates, containing one or more sockets, *c*, each for receiving and retaining one of the lenses *d*, which project up through and fill the said perforations in the rolled-metal plate. These cast-metal sectional re-enforcing plates may be secured to the rolled plate (which latter plate can now be made thinner and lighter,) by rivets *e*.

To make a water-tight joint the lenses are set with cement, (shown at *f* in the sockets *c*.) This gives a construction which enables me to get all the desirable qualities of the old cast-metal structure and of the old rolled-metal structure without any of the defects or objectionable features of either.

The cast-metal re-enforcing plates are rigid sockets for the lenses of the rolled-metal tile-plate, serving to retain such lenses permanently and safely therein. In case of the use of this illuminating tile-plate in elevator-doors, the great weight of the old cast-metal structure is done away with, and the constant forcing out or breakage of the lenses in the ordinary rolled-metal plates is also obviated.

I do not claim a tile-plate in which the principal plate is composed of cast metal, nor a tile-plate in which both the principal and re-enforcing plates are composed of cast metal, nor a tile-plate in which both principal and re-enforcing plates are composed of rolled metal; but What I do claim, and desire to secure by Letters Patent, is—

The combination, with a rolled-metal plate, of re enforcing cast-metal plates constructed with sockets *c*, carrying the lenses, substantially as and for the purposes described.

WILLIAM A. LINDSAY.

Witnesses:
JAMES H. HUNTER,
E. S. MAILLER.